United States Patent [19]

Vente et al.

[11] Patent Number: 5,391,255
[45] Date of Patent: Feb. 21, 1995

[54] APPARATUS AND METHOD FOR PRODUCING COMPOSITE SECTIONS FROM AT LEAST TWO INDIVIDUAL PROFILES

[75] Inventors: Paul Vente, Leverkusen; Heinrich Pesch, Dormagen; Udo Post; Ulrich Knipp, both of Bergisch Gladbach, all of Germany

[73] Assignee: Bayer Aktiengesellschaft, Leverkusen, Germany

[21] Appl. No.: 884,508

[22] Filed: May 15, 1992

[30] Foreign Application Priority Data

Jun. 1, 1991 [DE] Germany .................. 4118049.6
Mar. 23, 1992 [DE] Germany ................. 4209345

[51] Int. Cl.[6] .......................................... B29C 39/02
[52] U.S. Cl. ............................... 156/500; 156/242; 156/580
[58] Field of Search .............. 156/242, 244.22, 500, 156/580; 264/54, 45.8; 425/817 C

[56] References Cited

U.S. PATENT DOCUMENTS

| Re. 28,046 | 7/1974 | Barket ................. 29/200 A |
| Re. 28,086 | 7/1974 | Holliday et al. ........ 29/200 A |
| 3,624,885 | 12/1971 | Holliday et al. ........ 29/200 A |
| 4,381,907 | 5/1983 | Bischlipp et al. ......... 264/45.8 |
| 4,486,256 | 12/1984 | Kranz ....................... 156/517 |

FOREIGN PATENT DOCUMENTS

| 110340 | 9/1986 | European Pat. Off. . |
| 1432223 | 12/1966 | France . |
| 2305873 | 9/1974 | Germany . |
| 3209599 | 10/1983 | Germany . |
| 1343902 | 1/1974 | United Kingdom . |
| 1520190 | 8/1978 | United Kingdom . |

*Primary Examiner*—Caleb Weston
*Attorney, Agent, or Firm*—Joseph C. Gil

[57] ABSTRACT

Composite sections of differing cross sectional shapes and sizes can be produced from individual profiles economically by a method in which separate guides are associated with each profile. The guides can be adjusted transversely and vertically. The guides act through guide surfaces which bear upon the top, bottom and both sides of each profile.

6 Claims, 6 Drawing Sheets

APPARATUS AND METHOD FOR PRODUCING COMPOSITE SECTIONS FROM AT LEAST TWO INDIVIDUAL PROFILES

BACKGROUND OF THE INVENTION

The present invention relates to an apparatus and a method for producing composite sections from at least two individual profiles with at least one connecting insulating web. Such composite structures are used, in particular, for doors and windows. At least two individual profiles are guided in parallel at a spacing from one another by means of guides. At least one seal is inserted between the individual profiles, and a plastic material in a liquid form, which hardens to form the insulating web, is deposited on the seal. Devices of this type are known (see, e.g., German Auslegeschrift 3,822,083.

Only composite sections of the same type and with the same cross-sectional dimensions can be produced by means of the known methods and devices. This means that a specially adapted device must be used in each case. If the dimensions of the individual profiles vary, as sometimes happens, the devices cannot be readily adapted and such dimensional variations may have an adverse effect in the finished composite section, particularly if the dimensional variations of the two individual profiles are cumulative. Window frames produced from composite sections of this kind may then close without being tight. Since just one type of composite section can be produced by a device of this kind, such device operates uneconomically if it is not used to capacity. Specially formed composite sections often have to be produced in small quantities.

DESCRIPTION OF THE INVENTION

Figure 1:
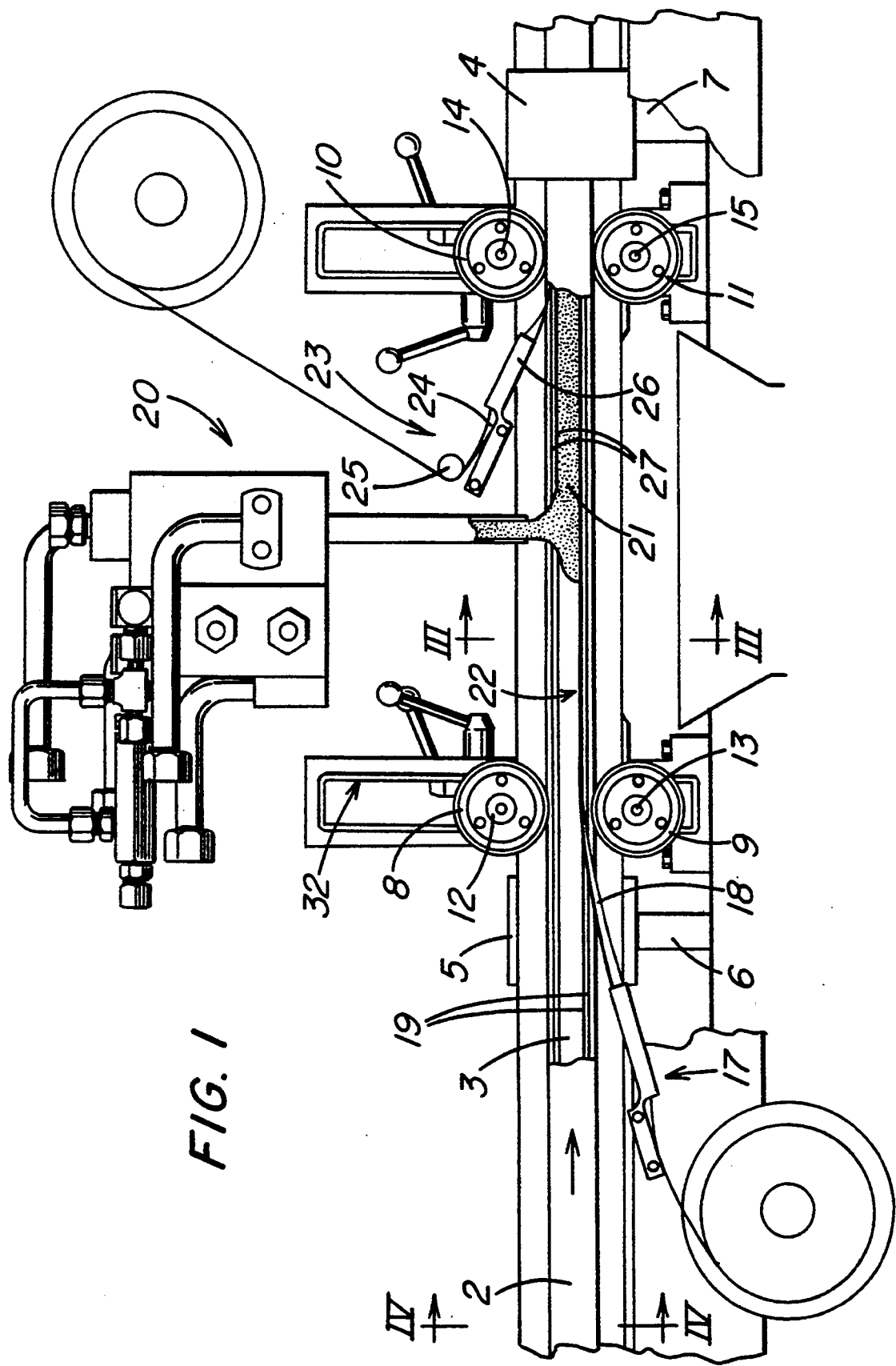
FIG. 1 is a side view of the apparatus of the present invention.
Figure 2:
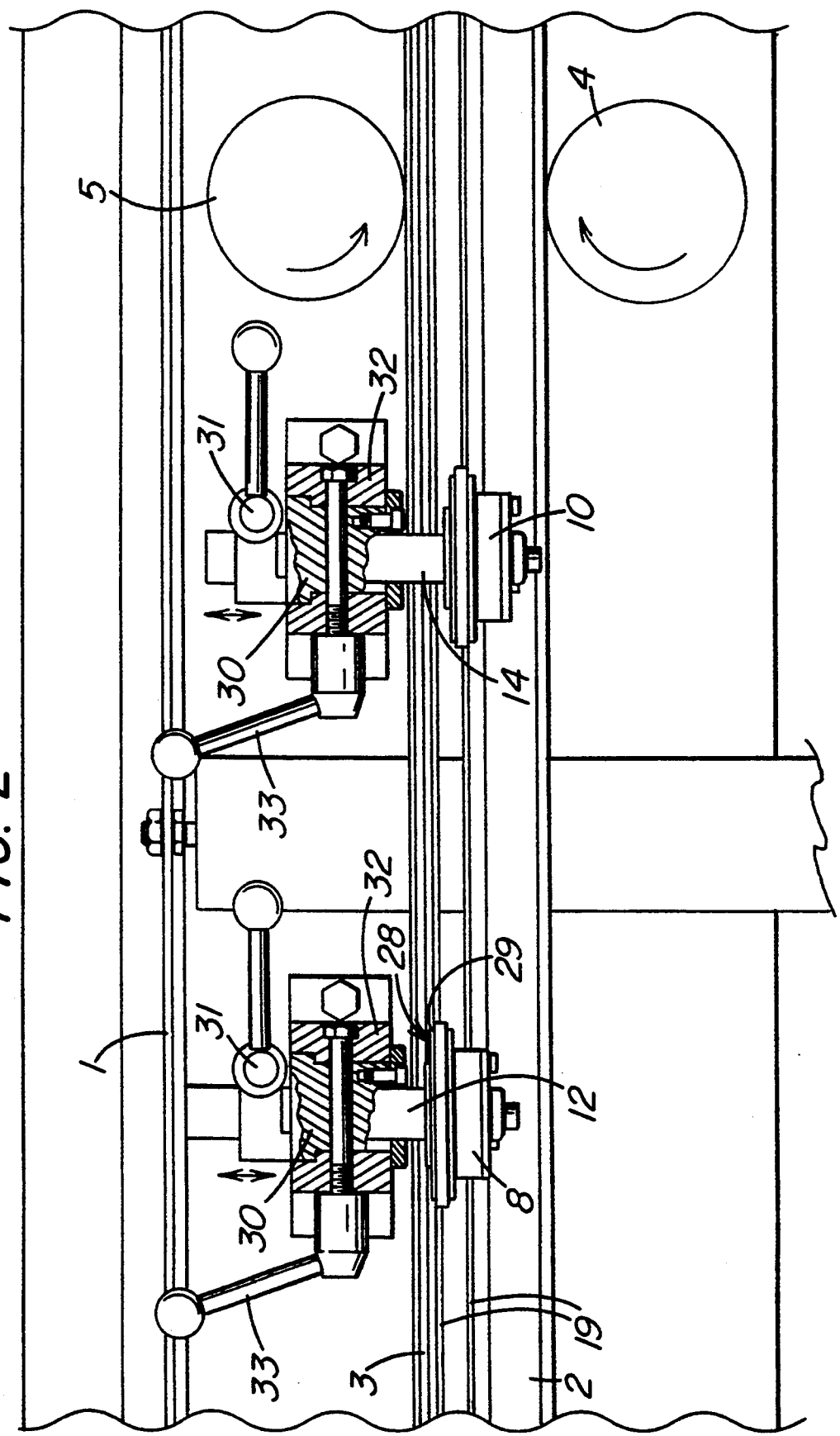
FIG. 2 is a plan view of the apparatus outside of the feed area.
Figure 3:
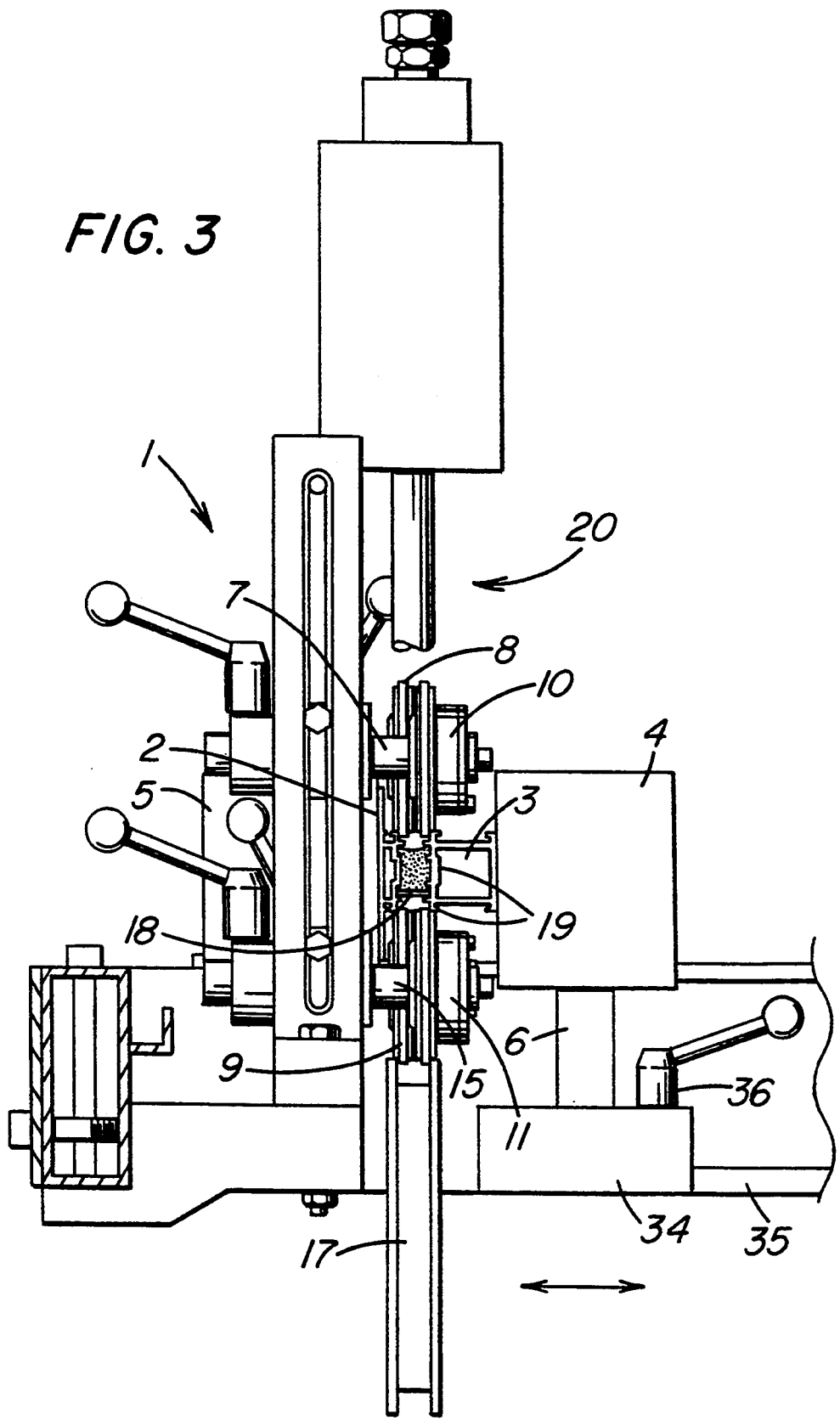
FIG. 3 is a cross-section along line A-B of FIG. 1.
Figure 4:
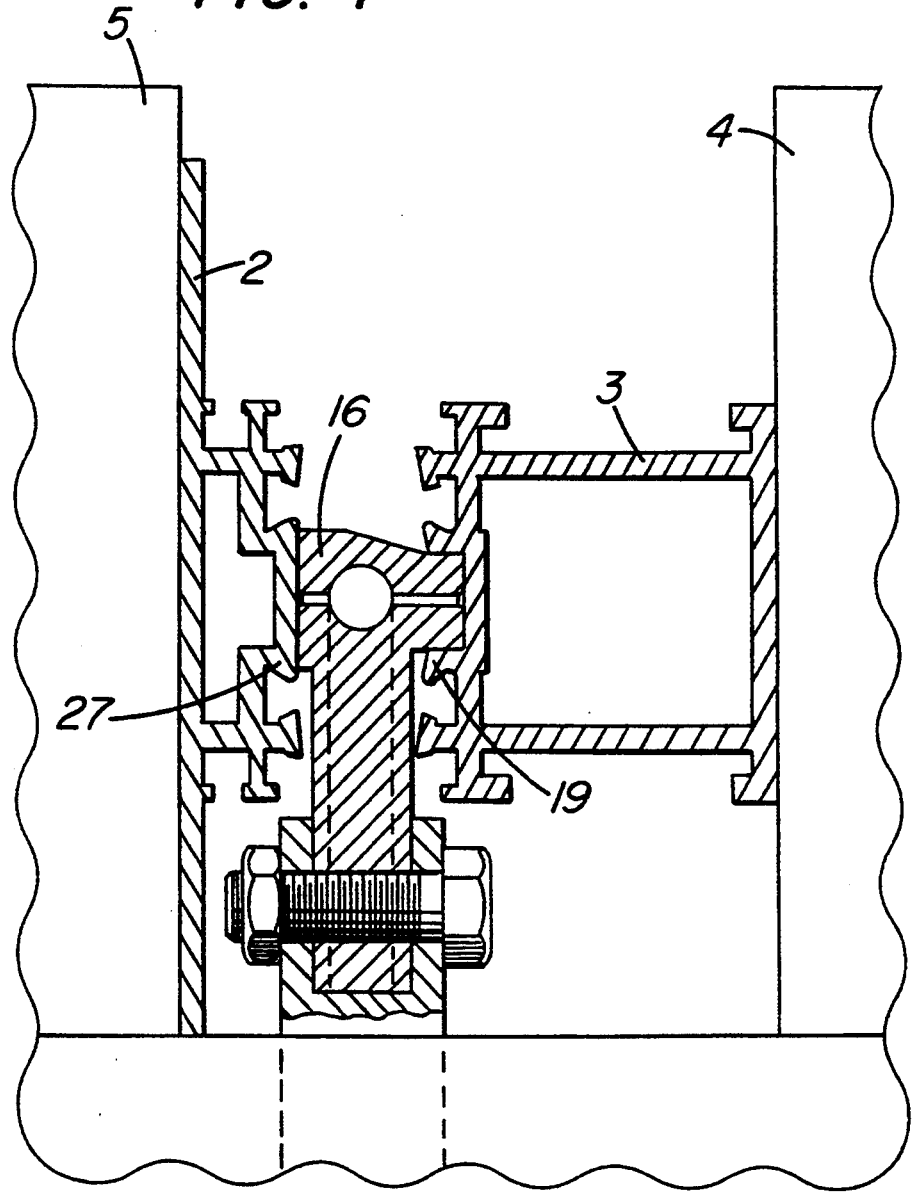
FIG. 4 is a scaled-up section along the line C-D of FIG. 1.

The above noted problem is solved in that each individual profile is separately guided by guide rollers which can be adjusted transversely and vertically to the guiding direction, and which guide rollers in each case comprise two guide surfaces, which form an angle with one another, and guide the individual profiles associated with them with one of their guide surfaces guiding from the top or bottom of the profile and with the other guide surface guiding from one side of the profile. Each individual profile is supported on the other side by an additional guide surface which is adjustable in at least the transverse direction.

It is thus possible to produce composite sections of various cross sections and sizes and, particularly when the dimensions of the individual profiles vary, to adjust the guides or guide rollers so as to maintain the important principal dimensions of the composite section by, for example, making the insulating web appropriately wider or narrower. The novel method enables the devices required to carry it out to be utilized to better effect. A particular advantage of the novel method lies in the fact that composite sections with a very narrow insulating web can also be produced. The individual profiles consist primarily of aluminum, steel or a plastic material, and the paired individual profiles can be varnished differently or surface-treated differently.

According to one particular embodiment, a supporting guide is used as the additional guiding surface. Alternatively, each individual profile is guided by guide rollers, at least some of which have a guiding groove which is defined by three guiding surfaces, with the width of the guiding groove being dictated by the individual profile to be guided by adjusting one of the lateral guide surfaces.

Individual profiles of different materials can of course also be paired, although in this case care must be taken to prevent the occurrence of problems due to differing thermal expansion.

The profiles are generally guided in an upright position, so that the channel formed between the individual profiles and the seal is open at the top if no additional covering is provided. The formation of the insulating web can thus be easily observed.

The novel method is of particular advantage when using a plastic material and individual profiles which are subject to shrinkage or cooling since the guides enable the guide length to be accurately adapted to the shrinkage.

A foil strip, for example of paper, a plastic material or metal, can be used as a seal. Its width must, however, be adapted to the spacing of the individual profiles. The profiles generally have ribs on the inside to which the foil strip is applied. Grooves into which the foil strip can be pushed are frequently also provided. A plurality of foil strips may also be inserted one above the other, in order, for example, to cover the insulating web at the top or to provide a plurality of insulating webs by pouring a plastic material in a liquid state onto each foil strip.

Finally, it is also possible to feed a filling element (such as, for example, wood or hollow sections of a plastic material, expanded plastic sections or similar materials) into the channel formed by the individual profiles and the foil strip, which filling element is embedded in the liquid plastic material. Filling elements of this kind preferably comprise spacers or protuberances in order to keep them positioned at a spacing from the foil strip and the insides of the individual profiles, so that they can be surrounded by the liquid plastic material. A granular plastic material, in particular a granular expanded plastic material, preferably recycled material, may also be poured into the channel formed by the individual profiles and the foil strip, over which material a liquid plastic material can be poured, so that the cavities are filled. Fillers, such as metal, chalk, glass flakes and the like, may also be included in the plastic material for the insulating web. It is of advantage also to introduce fibrous substances, e.g. glass fibers, in order to produce reinforcing effects. When selecting the fillers or filling elements, however, it must be borne in mind that their thermal conductivity or the constituent amount must be as low as possible.

The guides can be manually adjusted. However, according to one preferred embodiment, the guides are automatically adjusted via a control device and actuators on the basis of a predetermined program. This embodiment is of particular advantage if different composite sections frequently have to be produced in small quantities.

It may also be of advantage to guide the individual profiles at a spacing via an interchangeable spacer during the feed process. The slide surfaces of the spacer may be lubricated by a supply of air or another lubricant, these substances preferably being supplied through bores in the spacer.

The novel device for producing composite sections from at least two individual profiles with at least one connecting insulating web, in particular for doors and windows, is based on a production line, formed by guides for two individual profiles, which profiles are guided parallel to and spaced from each other, a device for introducing a sealing strip between the individual profiles, and a delivery device, which opens into the channel defined by the individual profiles and the sealing strip, for a plastic material in a liquid state.

The novelty lies in the fact that the guides can be adjusted transversely and vertically to the conveying direction, and consist of horizontally and vertically adjustable guide rollers provided separately for each individual profile below and above the latter, each of which guide rollers comprises two guide surfaces which are arranged at an angle to one another, one of these guide surfaces bearing against the associated individual profile from the bottom or the top and the other guide surface bearing against the associated individual profile on one side, with an additional guide surface bearing against the individual surface on the other side.

This arrangement enables the production line to be adapted to all types of individual profiles or composite sections. Accurate guidance is ensured by the fact that the individual profiles are guided by separate guide rollers, each of which guides the associated individual profile in at least two planes at the same time. Due to the specially formed guide rollers, composite sections with a very narrow insulating web can also be produced. The guide rollers can be adjusted in the simplest manner by means of clamping parts or threaded spindles.

According to one particular embodiment, the additional guide surface comprises a supporting guide consisting of, for example, circulating lateral belts or rollers with a vertical axis. Alternatively, at least some of the guiding rollers have a guiding groove which comprises the two guide surfaces arranged at an angle to one another and the additional guide surface, with one of the lateral guide surfaces being adjustable for regulating the width of the guiding groove.

According to another embodiment, actuators are associated with the guides, which actuators are connected to a control device via pulse transmission lines. This embodiment is particularly advantageous if different composite section types frequently have to be produced.

Hydraulically operating adjusting devices can also be used. In this case, hydraulic drives, which can be centrally started by a control unit via proportional valves, are associated with the guides.

The production line preferably comprises at the feed side an interchangeable spacer, which is provided with slide surfaces, for positioning the individual profiles. The advantage of providing a spacer, possibly in addition to guide rollers in the same area, lies in the presence of slide surfaces which are larger than the guide rollers and which stabilize the position of the individual profiles more quickly during the feed process. These slide surfaces can be lubricated by means of an air film or a liquid lubricant film, preferably supplied through bores in the spacer.

The novel device is illustrated in a purely diagrammatic form in the drawings and explained in detail in the following.

In FIGS. 1 to 4 the device consists of a guide line 1 for two individual profiles 2, 3, with two support guides 4, 5 in the form of rollers with vertical shafts 6, 7, which guides bear on the outside against the individual profiles 2, 3, and of guide rollers 8, 9, 10, 11, which are arranged on horizontal shafts 12, 13, 14, 15 along the guide line 1 above and below each individual profile 2, 3. A spacer 16, which is arranged between the individual profiles 2, 3, ensures that the individual profiles 2, 3 are kept spaced apart during the feed process.

An insertion device 17 for a sealing strip, which consists of a foil strip 18, is provided after the spacer in the production direction. This foil strip 18 is passed between ribs 19 of the individual profiles 2, 3. A delivery device 20 for a plastic material in liquid form is arranged above the individual profiles 2, 3 and opens into the channel 22 formed by the individual profiles 2, 3 and the foil strip 18. Finally, a further insertion device 23 for a second sealing strip in the form of a foil strip 24 is provided after the delivery device 20 above the guide line 1. This foil strip 24 is fed between ribs 27 after passing over a deflection roller 25 and a guide plate 26. Each of the guide rollers 8, 9, 10, 11 comprises a radial guide surface 28 and an axial guide surface 29, which surfaces are arranged at an angle of 90° to one another. The shafts 12, 13, 14, 15 of the guide rollers 8, 9, 10, 11 are mounted in clamping parts 30, in which they can be fixed so as to be accurately positioned by clamp dogs 31. The clamping parts 30 are arranged in sliders 32, in which they can likewise be fixed by clamp dogs 33.

Figure 5:
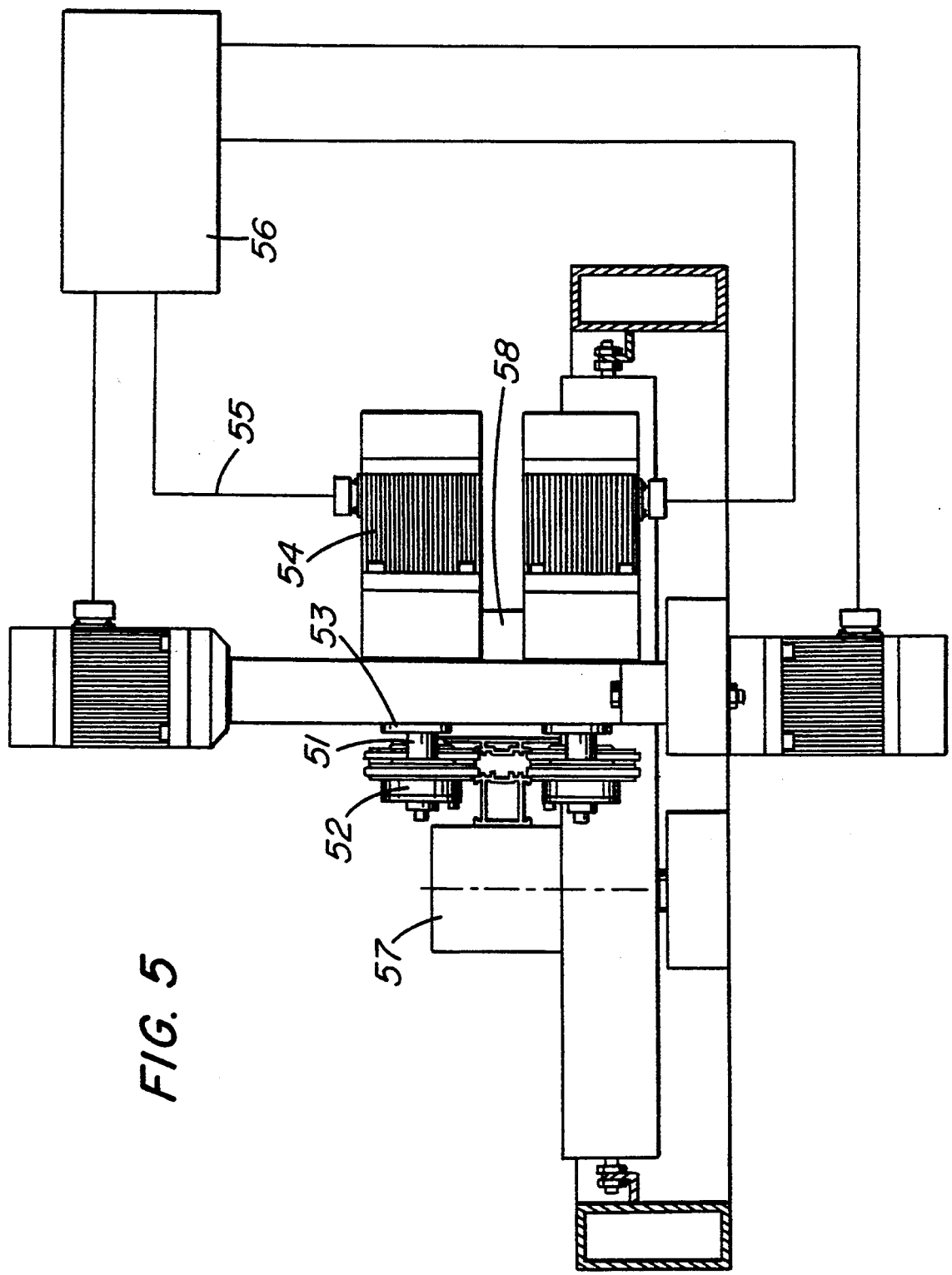
FIG. 5 is an embodiment of the apparatus with an automatic guide adjustment.

In the embodiment of FIG. 5, the shafts 51 of the guide rollers 52 are mounted in sliders 53, the shafts 51 being adjustable in the axial direction and the sliders 53 transversely to the axial direction by means of spindles, which are not shown, with electric stepping motors 54. These stepping motors 54 are controlled from an electronic control unit 56 via pulse transmission lines 55. The lateral supporting guides 57, 58 are similarly adjustable in the transverse direction, although this is not illustrated. It is merely indicated to prevent the figure from becoming obscure.

Figures 6, 6A:
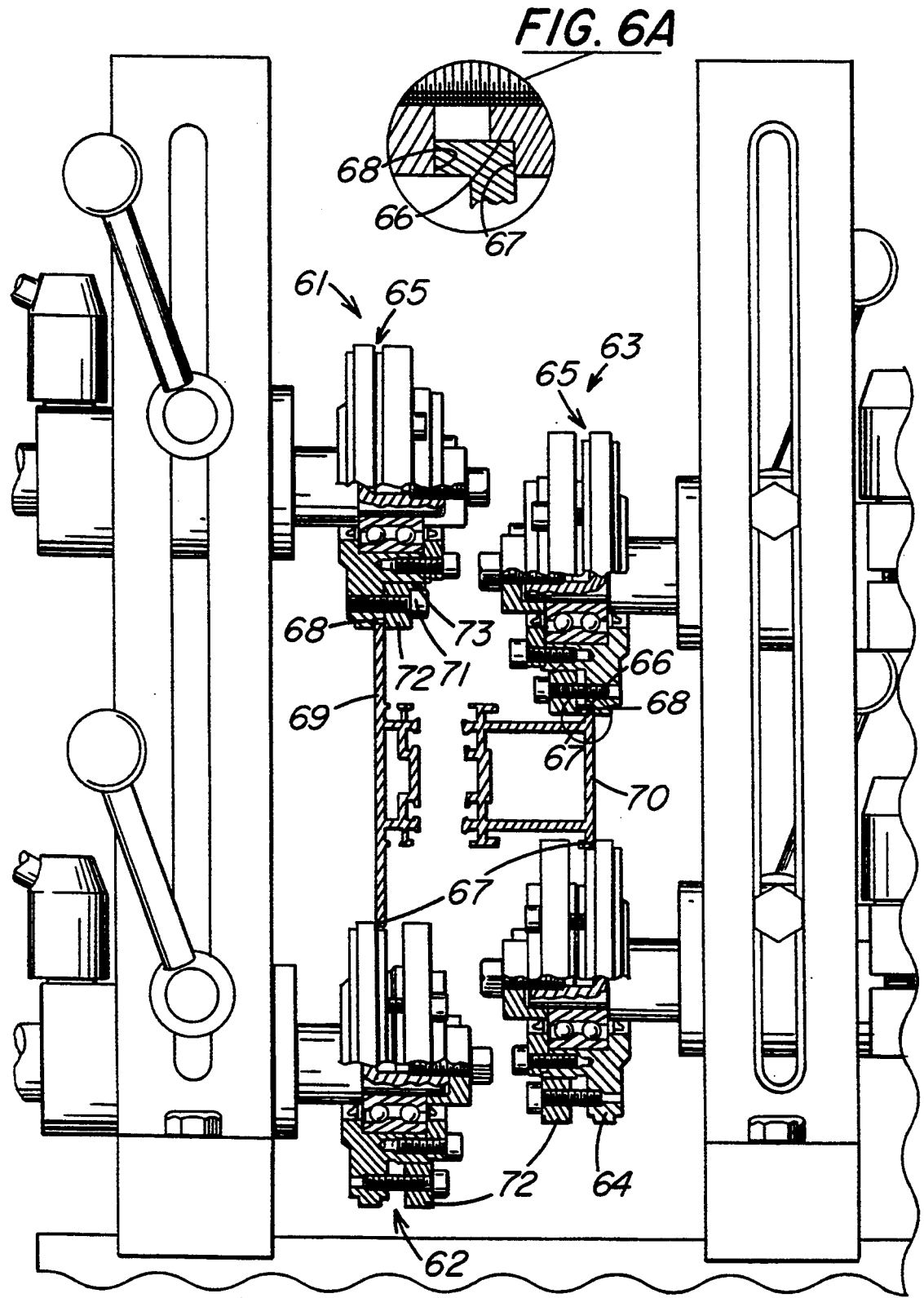
FIG. 6 is a partial cross-section of another embodiment of the apparatus, with a scaled up detail E showing the various guide surfaces.

In the embodiment of FIG. 6, the guide rollers 61, 62, 63, 64 have guiding grooves 65, one of the guide surfaces 66 is parallel to the roller axis and the two other guide surfaces 67, 68 are arranged radially. Guide surface 66 bears against the individual profiles 69, 70 from the top or bottom, guide surface 67 bears against the individual profiles laterally from the outside and guide surface 68 bears against the individual profiles laterally from the inside. Guide surface 68 is arranged on a ring 72 which is adjustable by means of the internal screw thread 73, so that the width of the guiding groove 65 can be regulated according to the individual profiles 69, 70. Screws 71 ensure that the ring 72 does not move. The lower guide rollers 62 and 64 show the rings 72 still in unadjusted position.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In an apparatus for producing composite sections from at least two individual profiles with at least one web connecting said profiles, comprising: a production line having guides for conveying two individual profiles, in a conveying direction, parallel to and spaced from each other, an insertion device for introducing a sealing strip between said individual profiles, and a delivery device which opens into a channel defined by the individual profiles and the sealing strip and which delivers plastic material in a liquid state, the improvement wherein i) said guides can be adjusted both transversely and vertically to the conveying direction, ii) horizontally and vertically adjustable guide rollers are provided for each profile above and below said profiles, each of said guide rollers comprising two guide surfaces which are arranged at an angle to each other, one of said guide surfaces bearing against the individual profile associated therewith from the bottom or top and the other guide surface bearing against the individual profile associated therewith on one side thereof, and iii) an additional guide surface bears against the other side of said individual profile.

2. The apparatus of claim 1, wherein said additional guide surface consists of a supporting guide.

3. The apparatus of claim 1, wherein at least some of the guide rollers are provided with guiding grooves which are formed by the two guide surfaces arranged at an angle to each other and the additional guide surface, with the width of said grooves can be adjusted.

4. The apparatus of claim 1, wherein actuators are associated with side guides, said actuators being connected to a control device via pulse transmission lines.

5. The apparatus of claim 1, wherein hydraulic drives, which can be centrally started by a control unit via proportional valves, are associated with said guides.

6. The apparatus of claim 1, wherein an interchangeable spacer for positioning the individual profiles is provided upstream of said delivery device.

* * * * *